United States Patent
Koskela et al.

(10) Patent No.: US 12,048,045 B2
(45) Date of Patent: Jul. 23, 2024

(54) CONNECTION RESUME HANDLING

(71) Applicant: Nokia Technologies Oy, Espoo (FI)

(72) Inventors: Jarkko Tuomo Koskela, Oulu (FI); Jussi-Pekka Koskinen, Oulu (FI)

(73) Assignee: Nokia Technologies Oy, Espoo (FI)

( * ) Notice: Subject to any disclaimer, the term of this patent is extended or adjusted under 35 U.S.C. 154(b) by 499 days.

(21) Appl. No.: 17/211,190

(22) Filed: Mar. 24, 2021

(65) Prior Publication Data

US 2021/0227615 A1 Jul. 22, 2021

Related U.S. Application Data

(63) Continuation of application No. PCT/EP2019/074623, filed on Sep. 16, 2019.

(60) Provisional application No. 62/738,269, filed on Sep. 28, 2018.

(51) Int. Cl.
*H04W 76/27* (2018.01)

(52) U.S. Cl.
CPC .................... *H04W 76/27* (2018.02)

(58) Field of Classification Search
CPC ..................................... H04W 76/27
USPC ......................................... 370/328
See application file for complete search history.

(56) References Cited

U.S. PATENT DOCUMENTS

| | | | | |
|---|---|---|---|---|
| 2018/0220486 A1* | 8/2018 | Tseng | .................. | H04W 36/305 |
| 2018/0270713 A1* | 9/2018 | Park | ...................... | H04L 5/0053 |
| 2018/0270895 A1 | 9/2018 | Park et al. | | |
| 2019/0313333 A1* | 10/2019 | Kim | .................. | H04W 52/0225 |
| 2019/0350033 A1* | 11/2019 | Wu | ........................ | H04W 76/27 |
| 2020/0053821 A1* | 2/2020 | Shih | ...................... | H04W 76/27 |
| 2020/0092779 A1* | 3/2020 | Jung | ..................... | H04W 36/14 |
| 2020/0351723 A1* | 11/2020 | Kim | ..................... | H04W 36/08 |
| 2020/0413279 A1* | 12/2020 | Kim | ..................... | H04W 76/27 |
| 2021/0022200 A1* | 1/2021 | Mildh | .................. | H04W 60/02 |
| 2021/0067966 A1* | 3/2021 | Teyeb | .................. | H04W 76/27 |
| 2021/0127445 A1* | 4/2021 | Da Silva | ............... | H04W 76/25 |
| 2021/0204192 A1* | 7/2021 | Lee | ......................... | H04L 67/62 |
| 2021/0266818 A1* | 8/2021 | Zhang | ................. | H04W 68/005 |
| 2021/0360730 A1* | 11/2021 | Kim | .................. | H04W 74/0833 |

OTHER PUBLICATIONS

Intel Corporation: "Capture NR Agreements into 36.331 for E-UTRA Connected to 5GC" Sep. 2018, XP051551336.

* cited by examiner

*Primary Examiner* — Mark G. Pannell
(74) *Attorney, Agent, or Firm* — Barta Jones, PLLC (57) ABSTRACT

A method, apparatus, and non-transitory program storage device for handling of a resumption in connection is described. The method includes determining whether a periodic radio access network based notification area update timer has expired; when the periodic radio access network based notification area update timer has been determined to have expired: setting a variable to a first setting; the variable comprising a pendingPeriodicRNAUpdate variable; and determining whether an upper layer has requested resumption of a radio resource control connection, and either: initiating a radio resource control connection resume procedure with a cause value set based on information received from the upper layers, or initiating a radio resource control connection resume procedure with a cause value set to rna-Update.

9 Claims, 5 Drawing Sheets

CONNECTION RESUME HANDLING

RELATED APPLICATION

This application is a continuation of International Application No. PCT/EP2019/074623, filed Sep. 16, 2019, which is incorporated by reference in its entirety, and this application claims the benefit of U.S. Provisional Application No. 62/738,269, filed Sep. 28, 2018, which is incorporated by reference in its entirety.

TECHNICAL FIELD

The exemplary and non-limiting embodiments relate generally to communications and, more particularly, to handling of a resumption in connection.

BACKGROUND

Radio Resource Control (RRC) is used in wireless communications such as 4G, LTE and 5G New Radio (NR) for example. Timers are used in a user equipment (UE) as part of this Radio Resource Control (RRC).

SUMMARY

The following summary is merely intended to be an example. The summary is not intended to limit the scope of the claims.

In accordance with an aspect, a method includes determining whether a periodic radio access network based notification area update timer has expired; when the periodic radio access network based notification area update timer has been determined to have expired: setting a variable to a first setting; the variable comprising a pendingPeriodicR-NAUpdate variable; and determining whether an upper layer has requested resumption of a radio resource control connection, and either: initiating a radio resource control connection resume procedure with a cause value set based on information received from the upper layers, or initiating a radio resource control connection resume procedure with a cause value set to rna-Update.

In accordance with an aspect, an apparatus includes at least one processor; and at least one non-transitory memory including computer program code, the at least one memory and the computer program code configured to, with the at least one processor, cause the apparatus to: determine whether a periodic radio access network based notification area update timer has expired; when the periodic radio access network based notification area update timer has been determined to have expired: set a variable to a first setting; the variable comprising a pendingPeriodicRNAUpdate variable; and determine whether an upper layer has requested resumption of a radio resource control connection, and either: initiate a radio resource control connection resume procedure with a cause value set based on information received from the upper layers, or initiate a radio resource e control connection resume procedure with a cause value set to rna-Update.

In accordance with an aspect, a non-transitory program storage device readable by a machine, tangibly embodying a program of instructions executable by the machine for performing operations is described, the operations comprising: determining whether a periodic radio access network based notification area update timer has expired; when the periodic radio access network based notification area update timer has been determined to have expired: setting a variable to a first setting; the variable comprising a pendingPeriodicRNAUpdate variable; and determining whether an upper layer has requested resumption of a radio resource control connection, and either: initiating a radio resource control connection a resume procedure with cause value set based on information received from the upper layers, or initiating a radio resource control connection resume procedure with a cause value set to rna-Update.

BRIEF DESCRIPTION OF THE DRAWINGS

The foregoing aspects and other features are explained in the following description, taken in connection with the accompanying drawings, wherein.

DETAILED DESCRIPTION OF EMBODIMENTS

Figure 1:
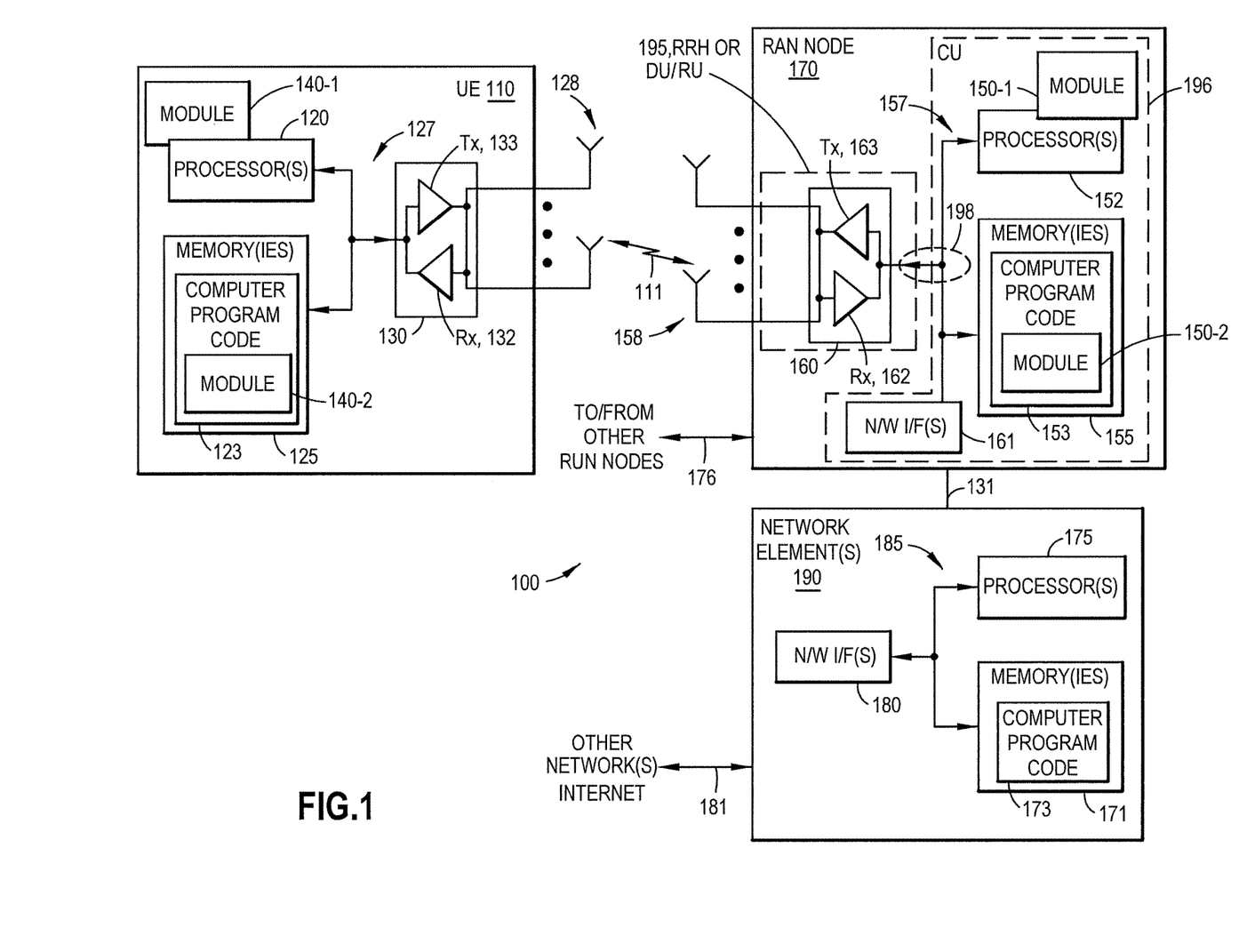
FIG. 1 is a block diagram of one possible and non-limiting example of a system in which example embodiments may be practiced.

Turning to FIG. 1, this figure shows a block diagram of one possible and non-limiting example in which the examples may be practiced. A user equipment (UE) 110, radio access network (RAN) node 170, and network element (s) 190 are illustrated. In the example of FIG. 1, the user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR).

In 5G, the RAN node 170 may be a NG-RAN node, which is defined as either a gNB or a ng-eNB. A gNB is a node providing NR user plane and control plane protocol terminations towards the UE, and connected via the NG interface to a 5GC (such as, for example, the network element (s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit (s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of an RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor (s) 152, memories 155, and network interfaces 161. Note that the DU 195 may also contain its own memory/memories and processor (s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 communicate using, e.g., link 176. The link 176 may be wired or wireless or both and may implement, e.g., an Xn interface for 5G, an X1 interface for LTE, or other suitable interface for other standards.

The one or more buses 157 may be address, data, or control buses, and may include any interconnection mechanism, such as a series of lines on a motherboard or integrated circuit, optics fiber or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, e.g., fiber optic cable or other suitable network connection to connect the other elements (e.g., a central unit (CU), gNB-CU) of the RAN node 170 to the RRH/DU 195. Reference 198 also indicates those suitable network link (s).

It is noted that description herein indicates that "cells" perform functions, but it should be clear that equipment which forms the cell will perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function (s) (AMF (S)) and/or user functions plane (UPF (s)) and/or session management function (s) (SMF(s)). Such core network functionality for LTE may include MME (Mobility Management Entity)/SGW (Serving Gateway) functionality. These are merely exemplary functions that may be supported by the network element (s) 190, and note that both 5G and LTE functions might be supported. The RAN node 170 is coupled via a link 131 to a network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from network the virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Figure 2:
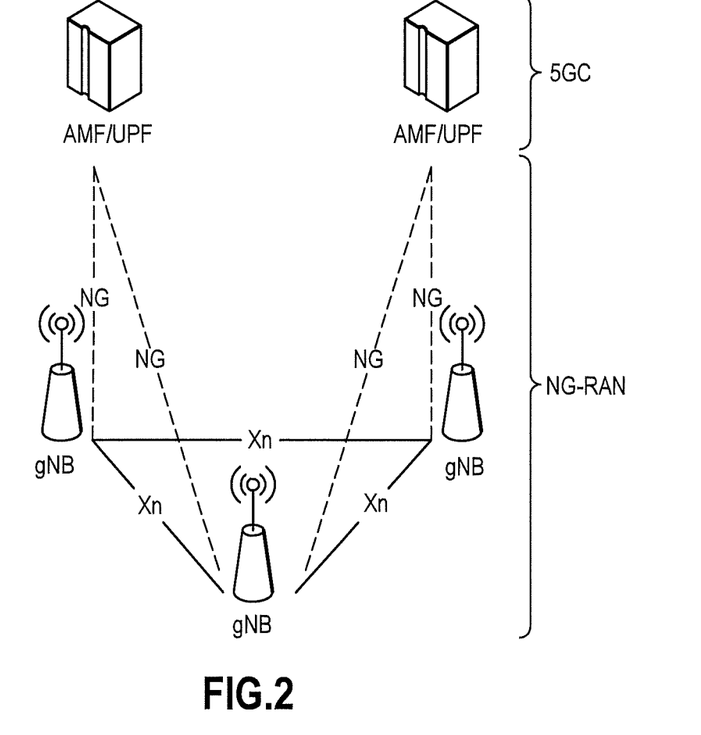
FIG. 2 is a schematic diagram illustrating an example of some components of a 5G New Radio system.
Figure 3:
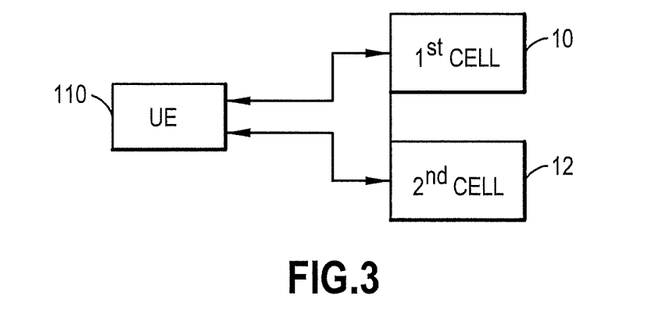
FIG. 3 is a diagram illustrating a user equipment coupled to a first cell and a second cell.

FIG. 2 shows an example of New Radio (NR) architecture having the 5G core (5GC) and the NG-RAN. The base stations gNB are coupled to the 5GC by the interface to Core NGs, and the gNBs are coupled to each other by the inter-base stations interface Xn. Referring also to FIG. 3, a user equipment (UE) 110 may be coupled to one or more cells 10, 12 such as via one of the base stations 170 gNB for example.

Having thus introduced one suitable but non-limiting technical context for the practice of the example embodiments, the example embodiments will now be described with greater specificity.

Features as described herein generally relate to 3GPP REL-15 NR. More specifically, features may be used in regard to RRC Connection Resume handling. Described herein is a new variable; pendingPeriodicRNAUpdate. This new variable may be set to TRUE when a periodic RNA update timer in the UE 110 expires, such as a T380 timer for example. The timer may comprise any suitable circuitry and software in the UE 110. The new variable, as further discussed below, may be set to FALSE when the UE 110 gets a "positive" response to a Resume request. If the new variable is TRUE when reselection occurs, then the UE 110 may restart a periodic RAN-based notification area (RNA) update procedure. In another alternative, when a reselection happens and the new variable is TRUE, the periodic RNA update timer, such as the T380 timer for example, may be restarted.

For a conventional system, if a T380 timer expires, and after that (for example during barring/wait timer (RRCReject)) the UE 110 makes a reselection, the variable pendingRNAUpdate is set to FALSE and the UE 110 will not retry a periodic RNA update procedure. In such a conventional system for a regular RNA update, this is acceptable behavior because, after reselection, the UE will restart the RNA update procedure if the cell is not part of the current RNA. However, in such a conventional system the UE might never make a periodic RNA update because the timer is started only at release of connection (which never happens in the case of a reject or access barring) when the network assigns a new T380 timer value. As described herein new variable, such as pendingPeriodicRNAUpdate for example, may be used to help insure that the UE 110 will perform a periodic RNA update procedure, even in the situation of a reject or access barring.

Reception of the RRCResume by the UE may comprises the following for example, such as to be defined in a subsection of section 5.3.13 of 3GPP TS 38.331 for example, where the UE performs the following operations:
stop timer T319;
if the RRCResume includes the fullConfig:
    perform the full configuration procedure such as specified in Section 5.3.5.11 of 3GPP TS 38.331 for example;
else:
    restore the PDCP state and reset COUNT value for SRB2 and all DRBs;
    restore the cellGroupConfig from the stored UE AS context;
    indicate to lower layers that stored UE AS context is used;
discard the fullI-RNTI, shortI-RNTI and the stored UE AS context, except ran-NotificationAreaInfo;
if the RRCResume includes the masterCellGroup:
    perform the cell group configuration for the received masterCellGroup such as according to Section 5.3.5.5 of 3GPP TS 38.331 for example;
For future study: Whether it is supported to configure secondaryCellGroup at Resume.
if the RRCResume includes the radioBearerConfig:
    perform the radio bearer configuration such as according to Section 5.3.5.6 of 3GPP TS 38.331 for example;
For future study: Whether there needs to be a second radioBearerConfig.
resume SRB2 and all DRBs;
if stored, discard the cell reselection priority information provided by the cellReselectionPriorities or inherited from another RAT;
stop timer T320, if running;
if the RRCResume message includes the measConfig:
    perform the measurement configuration procedure as specified in 5.5.2;
resume measurements if suspended;
For future study: Whether there is a need to define UE actions related to access control timers (equivalent to T302, T303, T305, T306, T308 in LTE). For example, informing upper layers if a given timer is not running.
enter RRC_CONNECTED;
indicate to upper layers that the suspended RRC connection has been resumed;
stop the cell re-selection procedure;
consider the current cell to be the PCell;
set the content of the of RRCResumeComplete message as follows:
    if the upper layer provides NAS PDU, set the dedicatedNAS-Message to include the information received from upper layers;
    if the upper layer provides a PLMN, set the selectedPLMN-Identity to PLMN selected by upper layers (TS 24.501 [23]) from the PLMN(s) included in the plmn-IdentityList in SIB1;

if the masterCellGroupConfig contains the reportUplinkTxDirectCurrent.
include the uplinkTxDirectCurrentList;
set the variable pendingRnaUpdate to 'FALSE';
set the variable pendingPeriodicRnaUpdate to 'FALSE';
submit the RRCResumeComplete message to lower layers for transmission;
the procedure ends.

As can be seen from the above, the variable pendingRnaUpdate may be set to 'FALSE', and the variable pendingPeriodicRnaUpdate may be set to 'FALSE'.

For timer T319 expiry or Integrity check failure from lower layers while T319 is running, the UE may perform the following operations:
if timer T319 expires or upon receiving Integrity check failure indication from lower layers while T319 is running:
perform the actions upon going to RRC_IDLE such as specified in Section 5.3.11 of 3GPP TS 38.331 for example with release cause 'RRC Resume failure'

For Cell re-selection while the timers T319 or T302 are running, the UE may perform the following operations:
set the variable pendingRnaUpdate to 'FALSE', if that is set to TRUE;
perform the actions upon going to RRC_IDLE such as specified in Section 5.3.11 of 3GPP TS 38.331 for example with release cause 'RRC Resume failure';

With reception of the RRCSetup by the UE, the UE may perform the following operations:
set the variable pendingRnaUpdate to 'FALSE';
set the variable pendingPeriodicRnaUpdate to 'FALSE';
perform the RRC connection setup procedure such as specified in Section 5.3.3.4 of 3GPP TS 38.331 for example;

As can be seen from the above, the variable pendingPeriodicRnaUpdate may be set to 'FALSE'.

Figure 4:
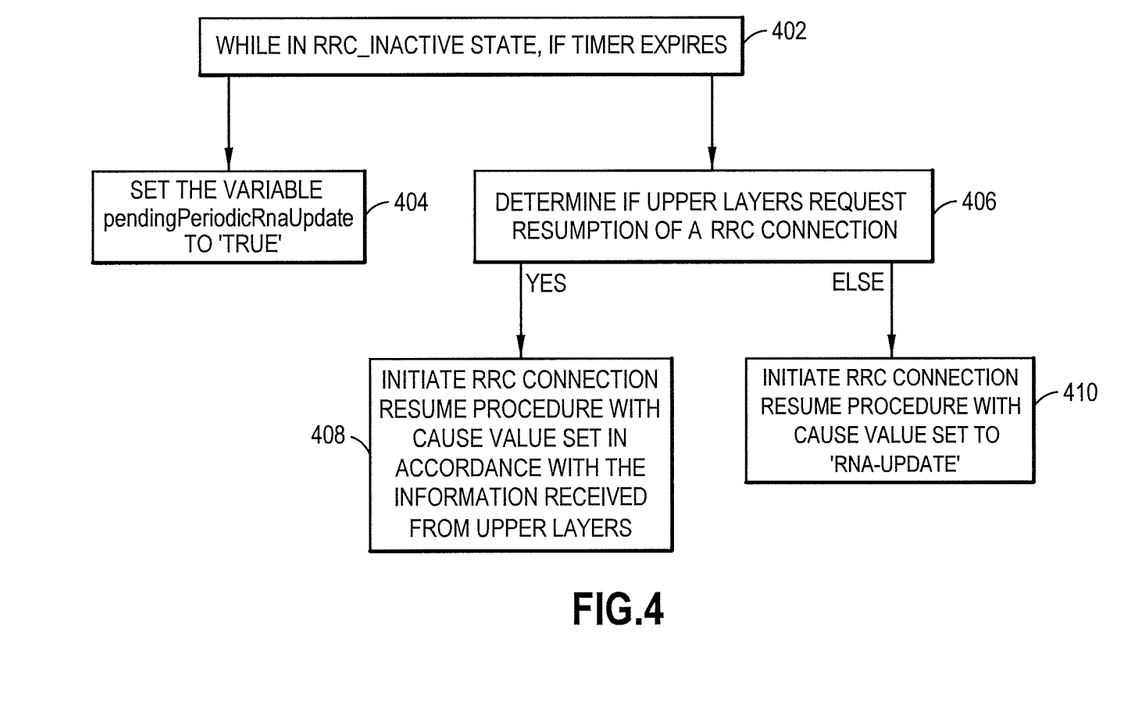
FIG. 4 is a diagram illustrating an example method.
Figure 5:
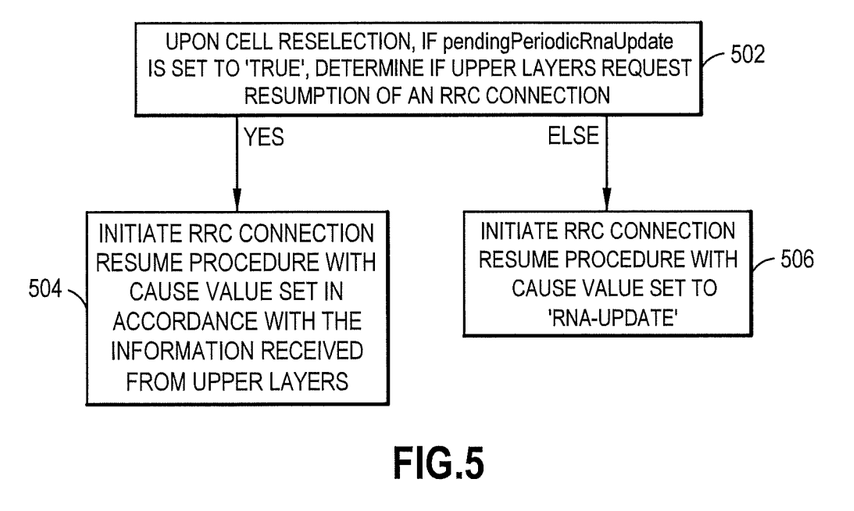
FIG. 5 is a diagram illustrating an example method.
Figure 6:
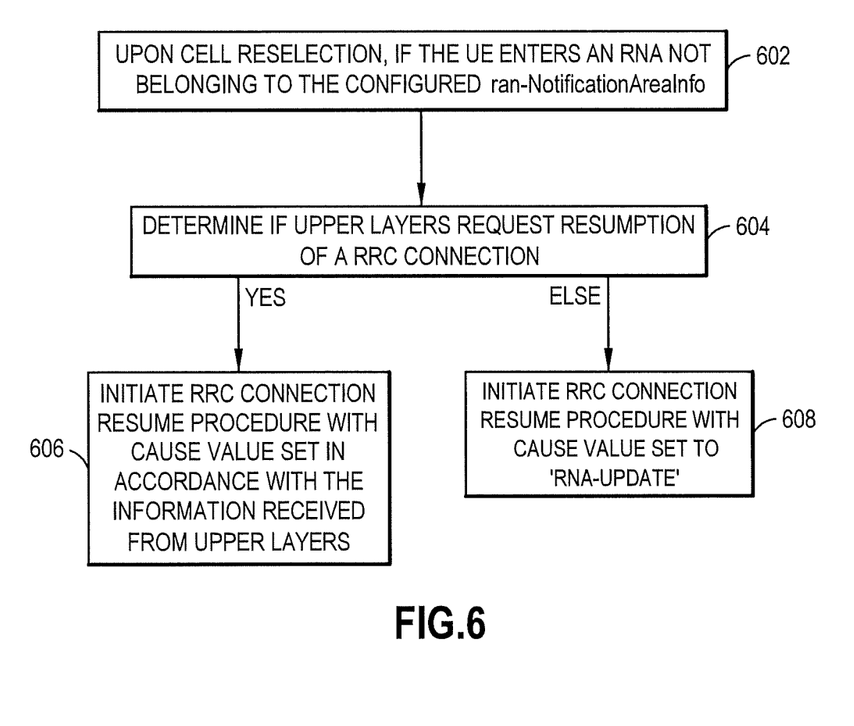
FIG. 6 is a diagram illustrating an example method.
Figure 7:
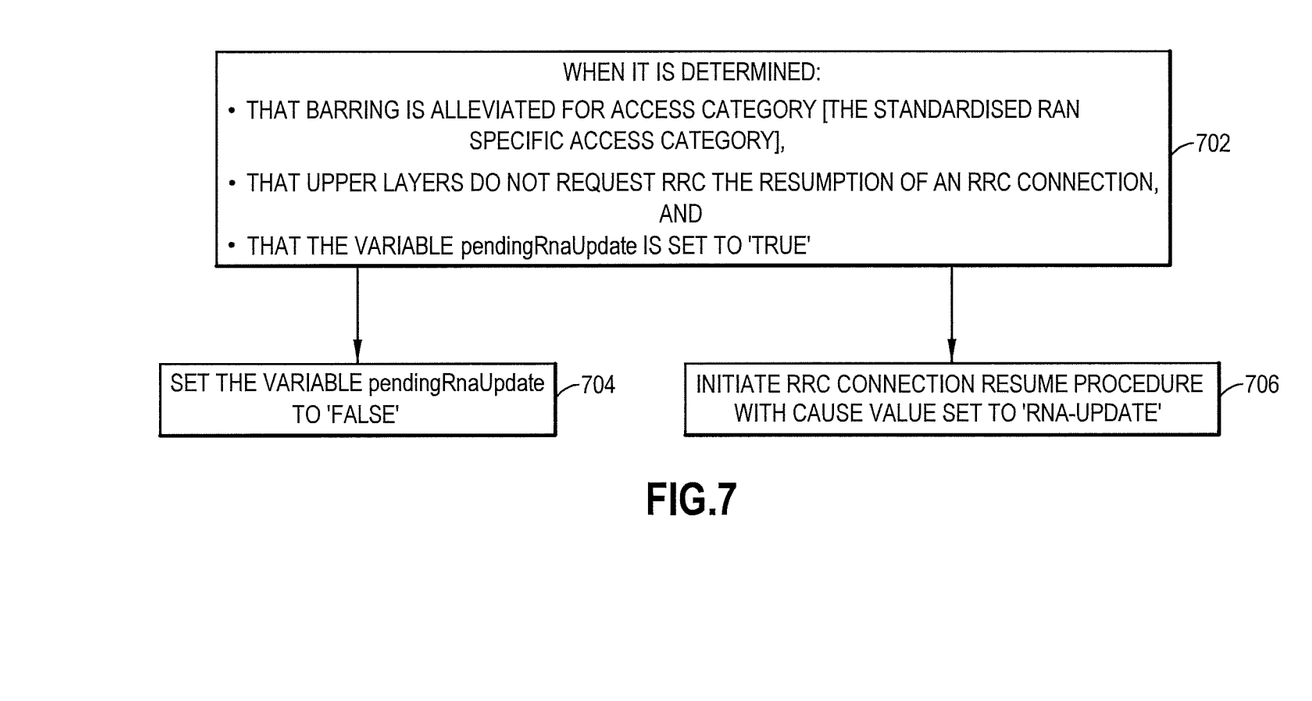
FIG. 7 is a diagram illustrating an example method.

For RNA update, while in RRC INACTIVE state, as seen with reference to FIG. 4, the UE may perform the following operations:
if T380 expires as indicated by 402;
set the variable pendingPeriodicRnaUpdate to 'TRUE' as indicated by 404;
if upper layers request resumption of an RRC connection as indicated by 406;
initiate RRC connection resume procedure such as in Section 5.3.13.2 of 3GPP TS 38.331 for example with cause value set in accordance with the information received from upper layers as indicated by 408;
else:
initiate RRC connection resume procedure such as in Section 5.3.13.2 of 3GPP TS 38.331 for example with cause value set to 'rna-Update' as indicated by 410;

As seen with reference to FIG. 5,
if, upon cell reselection, pendingPeriodicRnaUpdate is set to 'TRUE' as indicated by 502:
if upper layers request resumption of an RRC connection;
initiate RRC connection resume procedure such as in Section 5.3.13.2 of 3GPP TS 38.331 for example with cause value set in accordance with the information received from upper layers as indicated by 504;
else:
initiate RRC connection resume procedure such as in Section 5.3.13.2 of 3GPP TS 38.331 for example with cause value set to 'rna-Update' as indicated by 506;

As seen with reference to FIG. 6,
if, upon cell reselection, the UE enters an RNA not belonging to the configured ran-NotificationAreaInfo as indicated by 602:
if upper layers request resumption of an RRC connection as indicated by 604;
initiate RRC connection resume procedure such as in Section 5.3.13.2 of 3GPP TS 38.331 for example with cause value set in accordance with the information received from upper layers as indicated by 606;
else:
initiate RRC connection resume procedure such as in Section 5.3.13.2 of 3GPP TS 38.331 for example with cause value set to 'rna-Update' as indicated by 608;

As seen with reference to FIG. 7,
as indicated by 702 if barring is alleviated for Access Category [the standardised RAN specific access category], such as specified in Section 5.3.14.4 of 3GPP TS 38.331 for example:
if upper layers do not request RRC the resumption of an RRC connection, and
if the variable pendingRnaUpdate is set to 'TRUE':
set the variable pendingRnaUpdate to 'FALSE' as indicated by 704; and
initiate RRC connection resume procedure such as in Section 5.3.13.2 of 3GPP TS 38.331 for example with cause value set to 'rna-Update' as indicated by 706;

As used in this application, the term "circuitry" may refer to one or more or all of the following:
(a) hardware-only circuit implementations (such as implementations in only analog and/or digital circuitry) and
(b) combinations of hardware circuits and software, such as (as applicable): (i) a combination of analog and/or digital hardware circuit (s) with software/firmware and (ii) any portions of hardware processor (s) with software (including digital signal processor (s)), software, and memory (ies) that work together to cause an apparatus, such as a mobile phone or server, to perform various functions) and
(c) hardware circuit (s) and or processor (s), such as a microprocessor (s) or a portion of a microprocessor (s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined. Although various aspects are set out above, other aspects comprise other combinations of features from the described embodiments, and not solely the combinations described above. It is also noted herein that while the above describes example embodiments of the invention, these descriptions should not be viewed in a limiting sense. Rather, there are several variations and modifications which may be made without departing from the scope of the present invention.

In accordance with an example method, a method may be provided comprising: determining whether a periodic radio access network based notification area update timer has expired; when the periodic radio access network based notification area update timer has been determined to have expired: setting a variable to a first setting; the variable comprising a pendingPeriodicRNAUpdate variable; and determining whether an upper layer has requested resumption of a radio resource control connection, and either: initiating a radio resource control connection resume procedure with a cause value set based on information received from the upper layers, or initiating a radio resource control connection resume procedure with a cause value set to rna-Update.

The example method may further comprise: upon determining that barring is alleviated for access, that upper layers do not request RRC the resumption of an RRC connection, and that a variable pendingRnaUpdate is set to 'TRUE': setting the variable pendingRnaUpdate to ' FALSE'; and initiating the radio resource control connection resume procedure with the cause value set to rna-Update.

The example method may further comprise: determining whether a user equipment enters a radio access network based notification area not belonging to a configured ran-NotificationAreaInfo; in response to, upon occurrence of a cell reselection procedure, determining that the user equipment enters the radio access network based notification area not belonging to a configured ran-NotificationAreaInfo: determining whether an upper layer has requested resumption of a radio resource control connection and: initiating the radio resource control connection resume procedure with the cause value set based on the information received from upper layers, or initiating the radio resource control connection resume procedure with the cause value set to rna-Update.

The example method may further comprise: upon occurrence of a cell reselection procedure, determining whether the variable is set to the first setting; and determining whether an upper layer has requested resumption of a radio resource control connection and: initiating the radio resource control connection resume procedure with the cause value set based on the information received from the upper layer, or initiating the radio resource control connection resume procedure with the cause value set to rna-Update.

The example method may further include where the first setting is "True".

In accordance with an example apparatus, an apparatus may be provided comprising: means for determining whether a periodic radio access network based notification area update timer has expired; when the periodic radio access network based notification area update timer has been determined to have expired: means for setting a variable to a first setting; the variable comprising a pendingPeriodicRNAUpdate variable; means and for determining whether an upper layer has requested resumption of a radio resource control connection, and either: means for initiating a radio resource control connection resume procedure with a cause value set based on information received from the upper layers, or means for initiating a radio resource control connection resume procedure with a cause value set to rna-Update.

The example apparatus may further comprise: upon determining that barring is alleviated for access, that upper layers do not request RRC the resumption of an RRC connection, and that a variable pendingRnaUpdate is set to 'TRUE': means for setting the variable pendingRnaUpdate to 'FALSE'; and means for initiating the radio resource control connection resume procedure with the cause value set to rna-Update.

The example apparatus may further comprise: means for determining whether a user equipment enters a radio access network based notification area not belonging to a configured ran-NotificationAreaInfo; in response to, upon occurrence of a cell reselection procedure, determining that the user equipment enters the radio access network based notification area not belonging to a configured ran-NotificationAreaInfo: means for determining whether an upper layer has requested resumption of a radio resource control connection and: means for initiating the radio resource control connection resume procedure with the cause value set based on the information received from upper layers, or means for initiating the radio resource control connection resume procedure with the cause value set to rna-Update.

The example apparatus may further comprise: upon occurrence of a cell reselection procedure, means for determining whether the variable is set to the first setting; and means for determining whether an upper layer has requested resumption of a radio resource control connection and: means for initiating the radio resource control connection resume procedure with the cause value set based on the information received from the upper layer, or means for initiating the radio resource control connection resume procedure with the cause value set to rna-Update.

The example apparatus may further include where the first setting is "True".

In accordance with an example apparatus, an apparatus may be provided comprising: at least one processor; and at least one non-transitory memory including computer program code, the at least one memory and the computer program code configured to, with the at least one processor, cause the apparatus to: determine whether a periodic radio access network based notification area update timer has expired; when the periodic radio access network based notification area update timer has been determined to have expired: set a variable to a first setting; the variable comprising a pendingPeriodicRNAUpdate variable; and determine whether an upper layer has requested resumption of a radio resource control connection, and either: initiate a radio resource control connection resume procedure with a cause value set based on information received from the upper layers, or initiate a radio resource control connection resume procedure with a cause value set to rna-Update.

The example apparatus may further comprise wherein the at least one memory and the computer program code are further configured to, with the at least one processor, cause the apparatus to: upon determining that barring is alleviated for access, that upper layers do not request RRC the resumption of an RRC connection, and that a variable pendingRnaUpdate is set to 'TRUE': set the variable pendingRnaUpdate to 'FALSE'; and initiate the radio resource control connection resume procedure with the cause value set to rna-Update.

The example apparatus may further comprise wherein the at least one memory and the computer program code are further configured to, with the at least one processor, cause the apparatus to: determine whether a user equipment enters a radio access network based notification area not belonging to a configured ran-NotificationAreaInfo; in response to, upon occurrence of a cell reselection procedure, determining that the user equipment enters the radio access network based notification area not belonging to a configured ran-NotificationAreaInfo: determine whether an upper layer has requested resumption of a radio resource control connection and: initiate the radio resource control connection resume procedure with the cause value set based on the information received from upper layers, or initiate the radio resource control connection resume procedure with the cause value set to rna-Update.

The example apparatus may further comprise wherein the at least one memory and the computer program code are further configured to, with the at least one processor, cause the apparatus to: upon occurrence of a cell reselection procedure, determine whether the variable is set to the first setting; and determine whether an upper layer has requested resumption of a radio resource control connection and: initiate the radio resource control connection resume procedure with the cause value set based on the information received from the upper layer, or initiate the radio resource control connection resume procedure with the cause value set to rna-Update.

The example apparatus may further include where the first setting is "True".

In accordance with an example non-transitory program storage device, a non-transitory program storage device readable by a machine, tangibly embodying a program of instructions executable by the machine for performing operations is provided, the operations comprising: determining whether a periodic radio access network based notification area update timer has expired; when the periodic radio access network based notification area update timer has been determined to have expired: setting a variable to a first setting; the variable comprising a pendingPeriodicRNAUpdate variable; and determining whether an upper layer has requested resumption of a radio resource control connection, and either: initiating a radio resource control connection resume procedure with a cause value set based on information received from the upper layers, or initiating a radio resource control connection resume procedure with a cause value set to rna-Update.

The operations of the example non-transitory program storage device may further comprise: upon determining that barring is alleviated for access, that upper layers do not request RRC the resumption of an RRC connection, and that a variable pendingRnaUpdate is set to 'TRUE': setting the variable pendingRnaUpdate to 'FALSE'; and initiating the radio resource control connection resume procedure with the cause value set to rna-Update.

The operations of the example non-transitory program storage device may further comprise: determining whether a user equipment enters a radio access network based notification area not belonging to a configured ran-NotificationAreaInfo; in response to, upon occurrence of a cell reselection procedure, determining that the user equipment enters the radio access network based notification belonging to a configured ran-NotificationAreaInfo: determining whether an upper layer has requested resumption of a radio resource control connection and: initiating the radio resource control connection resume procedure with cause value set based on the information received from upper layers, or initiating the radio resource control connection resume procedure with cause value set to rna-Update.

The operations of the example non-transitory program storage may comprise: device further upon occurrence of a cell reselection procedure, determining whether the variable is set to the first setting; and determining whether an upper layer has requested resumption of a radio resource control connection and: initiating the radio resource control connection resume procedure with the cause value set based on the information received from the upper layer, or initiating the radio resource control connection resume procedure with the cause value set to rna-Update.

The example non-transitory program storage device may further include where the first setting is "True".

It should be understood that the foregoing description is only illustrative. Various alternatives and modifications can be devised by those skilled in the art. For example, features recited in the various dependent claims could be combined with each other in any suitable combination (s). In addition, features from different embodiments described above could be selectively combined into a new embodiment. Accordingly, the description is intended to embrace all such alternatives, modifications and variances which fall within the scope of the appended claims.

The following abbreviations that may be found in the specification and/or the drawing figures are defined as follows:

3GPP third generation partnership project
    3GPP TS 3GPP Technical Specification
    5G fifth generation
    5GC 5G core network
    AMF access and mobility management function
    CU central unit
    DU distributed unit
    DRB dedicated radio bearer
    eNB (or eNodeB) evolved Node B (e.g., an LTE base station)
    gNB (or gNodeB) base station for 5G/NR, i.e., a node providing NR user plane and control plane protocol terminations towards the UE, and connected via the NG interface to the 5GC
    EN-DC E-UTRA-NR dual connectivity
    en-gNB or En-gNB node providing NR user plane and control plane protocol terminations towards the UE, and acting as secondary node in EN-DC
    E-UTRA evolved universal terrestrial radio access, i.e., the LTE radio access technology
    I/F interface
    LTE long term evolution
    MAC medium access control
    MME mobility management entity NAS non-access-stratum
NG Interface to Core
ng-eNB or NG-eNB new generation eNB
NG-RAN new generation radio access network
NR new radio
N/W or NW network
PCell primary cell
PDCP packet data convergence protocol
PDU protocol data unit
PHY physical layer
PLMN public land mobile network
RAN radio access network
RAT radio access technology
RNA RAN-based notification area
Rel or REL release
RLC radio link control
RNTI radio network temporary identifier
RRH remote radio head
RRC radio resource control
RU radio unit
Rx receiver
SDAP service data adaptation protocol
SGW serving gateway
SIB system information block
SMF session management function
SRB signaling radio bearer
TS technical specification
Tx transmitter
UE user equipment (e.g., a wireless, typically mobile device)
UPF user plane function
Xn Inter-base stations interface

What is claimed is:

1. A method comprising:
determining whether a periodic radio access network based notification area update timer has expired;
when the periodic radio access network based notification area update timer has been determined to have expired:
setting a variable to 'TRUE' for restart of a periodic radio access network based notification area update procedure upon cell reselection; and
setting the variable to 'FALSE' upon receiving a positive response to a resume request for a radio resource control (RRC) connection;
the variable comprising a pendingPeriodicRNAUpdate variable, and by
determining whether an upper layer has requested resumption of the RRC connection, either:
initiating the RRC connection resume procedure with a cause value set based on information received from the upper layer, or
initiating the RRC connection resume procedure with a cause value set to rna-Update.

2. The method as in claim 1 further comprising:
upon determining that barring is alleviated for access, that an upper layer has not requested the resumption of an RRC connection, and that a variable pendingRnaUpdate is set to 'TRUE':
setting the variable pendingRnaUpdate to 'FALSE' and initiating the RRC connection resume procedure with a cause value set to rna-Update.

3. The method as in claim 1 further comprising:
determining whether a user equipment enters a radio access network based notification area not belonging to a configured ran-NotificationAreaInfo;
in response to, upon occurrence of a cell reselection procedure, determining that the user equipment enters the radio access network based notification area not belonging to a configured ran-NotificationAreaInfo:
determining whether an upper layer has requested resumption of an RRC connection and either:
initiating the RRC connection resume procedure with the cause value set based on the information received from upper layers, or
initiating the RRC connection resume procedure with the cause value set to rna-Update.

4. An apparatus comprising:
at least one processor; and
at least one non-transitory memory including computer program code, the at least one memory and the computer program code configured to, with the at least one processor, cause the apparatus to:
determine whether a periodic radio access network based notification area update timer has expired;
when the periodic radio access network based notification area update timer has been determined to have expired:
set a variable to 'TRUE' for restart of a periodic radio access network based notification area update procedure upon cell reselection; and
set the variable to 'FALSE' upon receiving a positive response to a resume request for a radio resource control (RRC) connection;
the variable comprising a pendingPeriodicRNAUpdate variable; and by
determining whether an upper layer has requested resumption of the RRC connection, either:
initiate the RRC connection resume procedure with a cause value set based on information received from the upper layer, or
initiate the RRC connection resume procedure with a cause value set to rna-Update.

5. The apparatus as in claim 4, wherein the at least one memory and the computer program code are further configured to, with the at least one processor, cause the apparatus to:
upon determining that barring is alleviated for access, that an upper layer has not requested the resumption of an RRC connection, and that a variable pendingRnaUpdate is set to 'TRUE':
set the variable pendingRnaUpdate to 'FALSE' and initiate the RRC connection resume procedure with a cause value set to rna-Update.

6. The apparatus as in claim 4, wherein the at least one memory and the computer program code are further configured to, with the at least one processor, cause the apparatus to:
determine whether a user equipment enters a radio access network based notification area not belonging to a configured ran-NotificationAreaInfo;
in response to, upon occurrence of a cell reselection procedure, determining that the user equipment enters the radio access network based notification area not belonging to a configured ran-NotificationAreaInfo:
determine whether an upper layer has requested resumption of an RRC connection and either:
initiate the RRC connection resume procedure with the cause value set based on the information received from upper layers, or
initiate the RRC connection resume procedure with the cause value set to rna-Update.

7. A non-transitory program storage device readable by a machine, tangibly embodying a program of instructions executable by the machine for performing operations, the operations comprising:

determining whether a periodic radio access network based notification area update timer has expired;

when the periodic radio access network based notification area update timer has been determined to have expired:

setting a variable to 'TRUE' for restart of a periodic radio access network based notification area update procedure upon cell reselection; and setting the variable to 'FALSE' upon receiving a positive response to a resume request for a radio resource control (RRC) connection;

the variable comprising a pendingPeriodicRNAUpdate variable, and by determining whether an upper layer has requested resumption of the RRC connection, either:

initiating the RRC connection resume procedure with a cause value set based on information received from the upper layer, or initiating the RRC connection resume procedure with a cause value set to rna-Update.

8. The non-transitory program storage device as in claim 7, the operations further comprising:

upon determining that barring is alleviated for access, that an upper layers has not requested the resumption of an RRC connection, and that a variable pendingRnaUpdate is set to 'TRUE':

setting the variable pendingRnaUpdate to 'FALSE' and initiating the RRC connection resume procedure with a cause value set to rna-Update.

9. The non-transitory program storage device as in claim 7, the operations further comprising:

determining whether a user equipment enters a radio access network based notification area not belonging to a configured ran-NotificationAreaInfo;

in response to, upon occurrence of a cell reselection procedure, determining that the user equipment enters the radio access network based notification area not belonging to a configured ran-NotificationAreaInfo:

determining whether an upper layer has requested resumption of an RRC connection and either:

initiating the RRC connection resume procedure with the cause value set based on the information received from upper layers, or initiating the RRC connection resume procedure with the cause value set to rna-Update.

* * * * *